(12) United States Patent
Kikuchi et al.

(10) Patent No.: US 6,478,040 B1
(45) Date of Patent: Nov. 12, 2002

(54) GAS SUPPLYING APPARATUS AND GAS SUBSTITUTION METHOD

(75) Inventors: Tsutomu Kikuchi, Tokyo (JP); Tetsuya Satou, Tokyo (JP); Akira Nishina, Tokyo (JP); Tetsuya Kimijima, Tokyo (JP)

(73) Assignee: Nippon Sanso Corporation, Tokyo (JP)

( * ) Notice: Subject to any disclaimer, the term of this patent is extended or adjusted under 35 U.S.C. 154(b) by 0 days.

(21) Appl. No.: 09/611,348

(22) Filed: Jul. 6, 2000

(30) Foreign Application Priority Data

Jul. 13, 1999 (JP) ............................................ 11-199571

(51) Int. Cl.[7] ................................................ G05D 7/06
(52) U.S. Cl. ...................... 137/1; 137/14; 137/505.14; 137/597; 137/624.2
(58) Field of Search .............................. 137/597, 624.2, 137/505.14, 1, 14

(56) References Cited

U.S. PATENT DOCUMENTS

| | | | | |
|---|---|---|---|---|
| 4,345,610 A | * | 8/1982 | Herter et al. | ........ 137/624.2 X |
| 5,241,987 A | * | 9/1993 | Ohmi et al. | ................. 137/597 |
| 5,259,233 A | * | 11/1993 | Brandt | ................... 137/597 X |
| 5,305,630 A | | 4/1994 | Molozay et al. | |
| 5,826,607 A | * | 10/1998 | Knutson et al. | ................ 137/1 |
| 5,900,214 A | | 5/1999 | Girard et al. | |

* cited by examiner

Primary Examiner—Stephen M. Hepperle
(74) Attorney, Agent, or Firm—Merchant & Gould P.C.

(57) ABSTRACT

Gas supplying apparatus and gas substitution method where machinery and parts constituting the gas system are not damaged, and where gas substitution in the gas system is carried out in a short time with good efficiency. The gas substitution, method for substituting a gas after switching into a gas supplying passage by switching the kind of gases to be supplied includes carrying out an operation for fluctuating a pressure in the gas supplying passage within a range of pressure limitation of component parts thereof until a concentration of a gas before switching remaining in the gas supplying passage becomes parts per billion (ppb) level while the gas after switching is made to flow in the gas supplying passage; setting the pressure to a predetermined pressure; and carrying out an operation for increasing a flow rate of the gas after switching in the gas supplying passage under a flow rate limitation of the component parts thereof until the concentration of the gas is before switching remaining in the gas supplying passage becomes sub-ppb level.

5 Claims, 4 Drawing Sheets

GAS SUPPLYING APPARATUS AND GAS SUBSTITUTION METHOD

FIELD OF THE INVENTION

The present invention relates to a gas supplying apparatus and a gas substitution method, more particularly to a gas supplying apparatus and a gas substitution method capable of carrying out gas substitution efficiently when plural kinds of high-purity gases are switched and supplied.

DESCRIPTION OF THE PRIOR ART

In the field of semiconductor industry, many gas-phase processes have been used in a device manufacturing process. It has been understood that if a very small amount of gas impurities exists in a high-purity bulk gas used in the gas-phase processes, the gas impurities have bad effects on the device performance. Therefore, a gas system for supplying high-purity gases is needed to avoid the situation where the gas system becomes a contaminating source of the impurities. Furthermore, the gas system must be capable of carrying out rapid substitution of a high-purity gas and of decreasing impurity concentration in a short time when a different high-purity gas commences to be supplied.

In the field of observing and analyzing impurity concentration in a high-purity gas, a high-sensitivity gas analyzing system using an analyzer such as an atmosphere pressure ionization mass spectrometer (AIPMS) if often employed. In the high-sensitivity gas analyzing system, there is a necessity that various kinds of gases be sequentially analyzed in a short time by using same analyzer. For this, since a prior gas having flowed becomes an impurity when gases are switched, rapid substitution in the gas system by a sample gas is required for a sampling system.

Generally, there exists, in a gas system, coupling parts or branching parts of pipes with a gas staying portion which has a bad effect on purge efficiency, an analyzer having an ion source with a complex structure and/or an analyzing column and detection unit, and a shutoff valve or a switching valve having many resin parts which hinder rapid purge by absorbing a gas, or the like. Therefore, when gas substitution in. a gas system is carried out, these parts determine rate control of the substitution of the entire gas system. As effecting purge methods in gas systems, a batch purge which fluctuates pressure from high pressure (~10 Mpa) to vacuum state (below 1 torr) to create a state of stopping the gas flow, or a flow purge with a high flow rate (litter/min) have been known.

However, these purge methods using high pressure or the load of a high volume of gasoline to flow rate when applied to the machinery or parts constitution a gas system become a cause of breakage or failure of parts and the like, such that there are many cases where the purge methods cannot be utilized. Therefore, since sometimes a measure to increase the flow rate to about several litters is necessarily taken, it takes a very long time in the gas substitution. In particular, when a high-purity gas whose impurity concentration is below parts per billion (hereinafter ppb) level is supplied, there is a need to carry out gas substitution sufficiently.

SUMMARY OF THE INVENTION

Therefore, the object of the present invention is to provide a gas supplying apparatus and a gas substitution method which does not damage the machinery and parts constituting the gas system, and which is capable of carrying out gas substitution in the gas system in a short time with good efficiency.

To achieve the above-mentioned object of the present invention, there is provided a gas supplying apparatus for switching and supplying plural kinds of gas, the apparatus comprising: a gas supplying passage; a gas exhaust passage connected to the gas supplying passage; a back pressure regulator provided in the gas supplying passage or the gas exhaust passage; a flow rate regulator provided in the gas supplying passage or the gas exhaust passage; and a control means for operating the back pressure regulator and the flow rate regulator with a predetermined sequence.

Furthermore, according to the present invention, there is provided a gas substitution method for substituting a gas after switching into a gas supplying passage by switching the kind of gases to be supplied, the method comprising the steps of: carrying out an operation for fluctuating pressure in the gas supplying passage within a range of pressure limitation of component parts thereof until a concentration of a gas before switching remaining in the gas supplying passage becomes ppb level when the gas after switching is made to flow in the gas supplying passage; setting the pressure to a predetermined pressure; and carrying out an operation for increasing flow rate of the gas after switching in the gas supplying passage under a flow rate limitation of the component parts thereof until the concentration of the gas before switching remaining in the gas supplying passage becomes sub-ppb level.

Furthermore, the method further comprises the steps of: providing a gas exhaust passage connected to the gas supplying passage; providing a back pressure regulator in the gas supplying passage or the gas exhaust passage; and providing a flow rate regulator in the gas supplying passage or the gas exhaust passage connected to the gas supplying passage; wherein the operation for fluctuating the pressure in the gas supplying passage is carried out by the back pressure regulator; and the operation for increasing the flow rate of a gas is carried out by the flow rate regulator.

BRIEF DESCRIPTION OF THE INVENTION

DETAILED DESCRIPTION OF PREFERRED EMBODIMENTS

Figure 1:
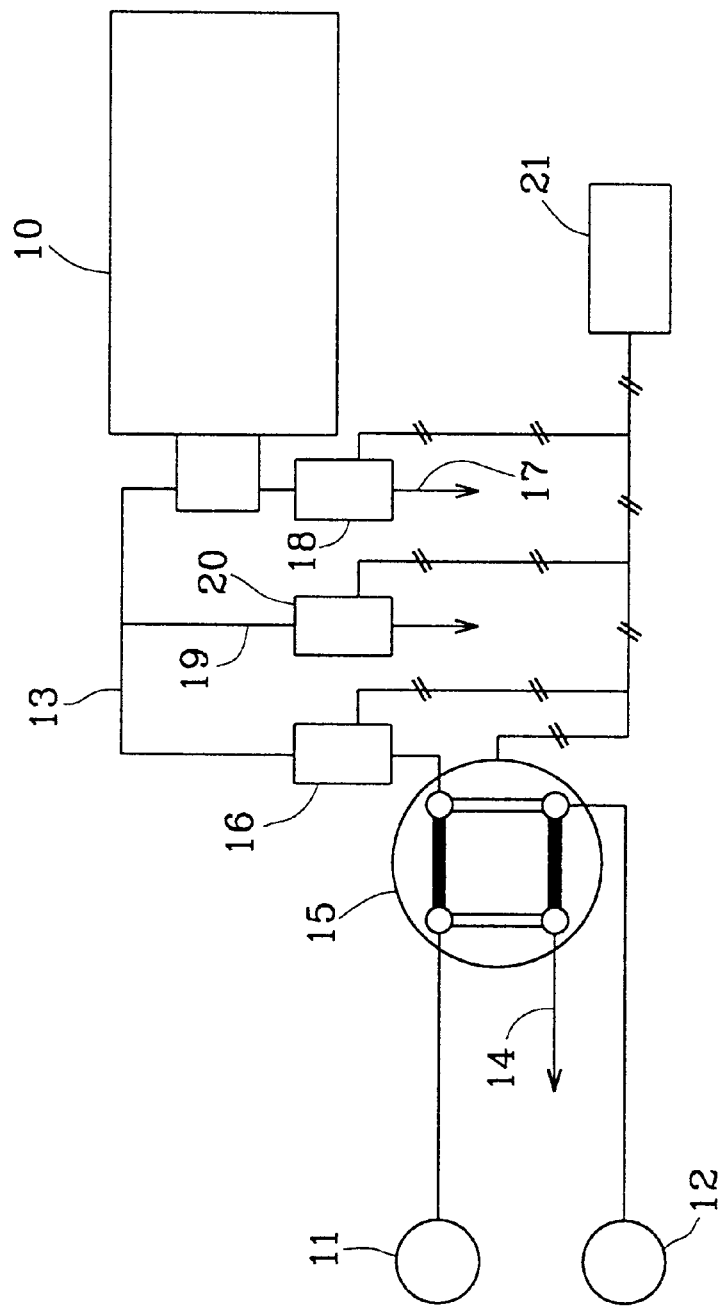
FIG. 1 is a systematic view showing an embodiment of a gas supplying apparatus according to the present invention.

FIG. 1 is a systematic view showing an embodiment of gas supplying apparatus according to the present invention. The gas supplying apparatus is for switching and supplying two kinds of gases, particularly gases having a high degree of purity whose impurity concentration is below ppb level, to an analyzer 10. The gas supplying apparatus is provided with a switching value 15 (4-way valve) for switching a passage for the gases supplied from two gas sources 11, 12 into an analyzing passage 13 directed to the analyzer 10 and into a purge passage 14, a flow rate regulator 16 for regulating gas amount flowing along the analyzing passage 13, a flow rate regulator 18 for exhaust gas for regulating the amount of the exhaust gas flowing along an exhaust passage 17 of the analyzer 10, a back pressure regulator 20 provided in a discharge passage 19 branched from the analyzing passage 13 for regulating a pressure in the gas system, and a control means 21 for controlling the machinery or regulators 15, 16, 18, 20.

In the present invention, either the flow rate regulator 16 or the flow rate regulator 18 may be provided alone. The flow rate regulators are preferably provided only in the exhaust passage 17 in a microanalysis analyzer like APIMS, considering that the flow rate regulators become contaminating sources. Furthermore, when the flow rate regulator 16 is provided in the analyzing passage 13, it is preferred to select a flow rate regulator having an excellent purge performance, Moreover, when the flow regulator 15 is provided in the analyzing passage 13, the back pressure regulator 20 can be provided in the exhaust passage 17 without providing the discharge passage In the gas supplying apparatus, thus formed, the gas substitution after switching the switching valve 15 is carried out as follows. In this regard, the present invention will be explained by assuming a pressure of the gases supplied from the gas sources 11, 12 commonly of 0.3 Mpa (absolute pressure, same hereinafter), a set value of the back, pressure regulator 19 during common analysis of 0.13 Mpa, a set value of the flow rate regulator 16 of 2 litter/min, a set value of the flow rate regulator 15 of 1.5 litter/min.

By switching the switching valve 15, a gas(e.g., nitrogen) from the gas source 11 is switched to a gas(e.g., hydrogen) from the gas source 12. Then, an operation for fluctuating the set value of the back pressure regulator 20 between a low pressure and a high pressure respectively is carried out. For example, the operation for fluctuating the pressure of 0.1 Mpa and 0.3 Mpa is carried out keeping a state where gas flows through the flow rate regulators 16, 18 fixed to the above respective set values. In the pressure fluctuating operation, the machinery or parts are not damaged since pressure is set to values of maximum pressure and minimum pressure within a range of pressure limitation.

Furthermore, the set value of pressure may be switched right after pressure in the gas system reaches the set pressure, however, the set value of pressure may also be switched after appropriate time passes, for example, after respectively maintaining pressure at 0.1 Mpa for 5 seconds and at 0.3 Mpa for 3 seconds. The number of times for repeating the pressure fluctuating operation is preferably set according to the conditions, such as volume or length of the entire gas system, range of pressure fluctuation, or the like, however, it is sufficient to carry out about 5~6 times for about 1~2 minutes for a gas system during common analysis. It is possible to decrease the residual concentration of nitrogen supplied in advance down to ppb level swiftly by carrying out the above pressure fluctuating operation.

After a predetermined pressure fluctuating operation comes to an end, the set value of the back pressure regulator 20 is restored to 0.13 MPa which is the standard value. Then, an operation for increasing the set values of flow rates of the flow rate regulators 16, 18, is carried out. For example, the operation for increasing the set value of the flow rate regulator 16 to 4 litter/min and the set value of the flow regulator 18 to 3.5 litter/min and maintaining the values for a predetermined time is carried out. In this flow rate increasing operation, there is no case where machinery or parts receive damage due to a large volume of gas flowing at a gas flow rate set at a value of the gas flow rate below its flow rate limitation. A time for the flow rate increasing operation is, similar to the above, preferably set according to the conditions, such as a volume or a length of the entire gas system, the set value of the flow rate, or the like, however, it is sufficient to carry out about 3~6 minutes for a gas system doing common analysis.

As described above, it is possible to decrease a nitrogen concentration which has been decreased to ppb level in the pressure fluctuating operation, to sub-ppb level in the flow rate increasing operation, by carrying out the pressure fluctuating operation flowed by the flow rate increasing operation. The above purge operations may be carried out by hand-operating the flow regulators 16, 18 or the back pressure regulator 20, including operation of the switching valve 15, however, a series of operations are automatically carried out by the control means 21, having a predetermined purge sequence.

That is to day, it is possible to carry out an operation of switching the gas to be supplied up by substituting the gas in the gas system completely automatically, by inputting the set values of the high pressure and the low pressure of the back pressure regulator 20, the maintaining time after reaching the set pressures, the continuation time of the pressure fluctuating operation, the set values of flow rate increase of the flow rate regulators 16, 18, the continuation time of the flow rate increasing operation, or the like, to the control means 21 provided with a sequencer and a programmer with the optimum conditions according to the apparatus constitution in advance.

Furthermore, it is also possible to decrease the nitrogen concentration using only either with the above pressure fluctuating operation(the pressure fluctuating purge) or with the flow rate increasing operation(the flow rate increasing purge), however, it takes a long time to decrease down to the sub-ppb level. Furthermore, it may be considered to carry out the flow rate increasing operation in advance, however, in view of the both purge characteristics, the more effective purge (the gas substitution) may be carried out by first carrying out the pressure fluctuating operation capable of purging effectively a gas containing impurities of high concentration above ppb level staying in a dead space in the gas system and then, carrying out the flow rate increasing operation capable of purging effectively the impurities adsorbed in the gas system. That is to say, if the pressure fluctuating operation is carried out after the flow rate increasing operation, there occurs a case where impurities purged from the dead space by the pressure fluctuating operation flow in the gas system purged by the flow rate increasing operation and impurities are adsorbed therein so that it is impossible to make the most of the both purge characteristics sufficiently.

Furthermore, the present embodiment shows a basic construction of the gas supplying apparatus, however, the machinery for supplying a gas is not limited to the analyzer and the present invention may be also applied to the apparatus for supplying a gas to various types of semiconductor manufacturing apparatuses. Furthermore, more than three kinds of gases may be switched and supplied by appropriately arranging valves or passages and in this case, it is still possible to carry out the gas substitution effectively.

Embodiment

Figure 2:
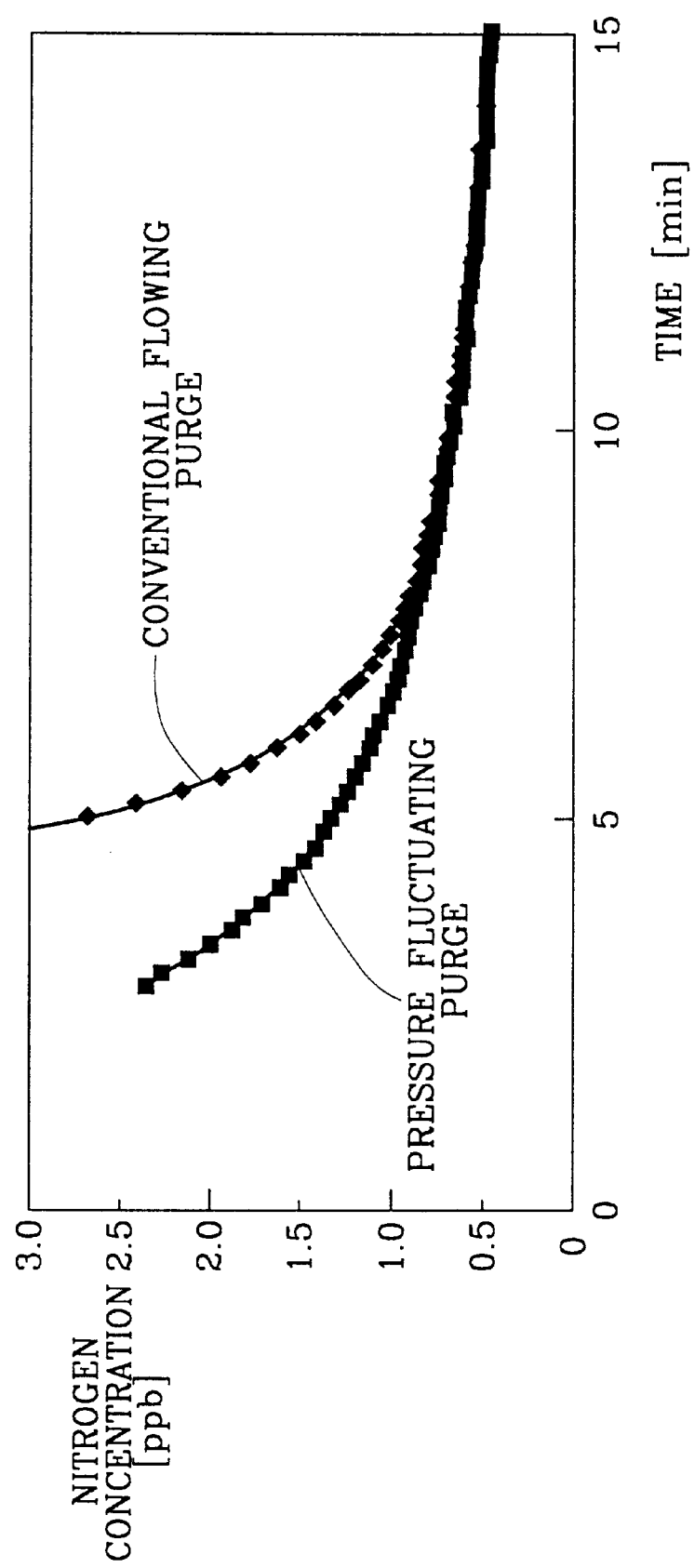
FIG. 2 is a graph showing a concentration change of nitrogen for a conventional flowing purge and a pressure fluctuating purge.

In a gas supplying apparatus having a construction as shown in FIG. 1, concentration of nitrogen in hydrogen was sequentially measured by an analyzer after a gas to be supplied was switched from nitrogen to hydrogen. First, the concentration change of nitrogen, when hydrogen was supplied with the standard setting where the flow rate is 2 litter/min(the flow rate regulator 16, same hereinafter) and 1.5 litter/min(the flow rate regulator 18, same hereinafter)

was measured (conventional flowing purge) and the pressure is 0.13 MPa,. Next, it was carried out that the operation for fluctuating the pressure in the gas system between 0.1 MPa(for 5 seconds) and 0.3 MPa (for 3 seconds) with the flow-rate set as indicated. Then, concentration change of nitrogen, when the supply of hydrogen was continued by restoring the pressure to 0.13 MPa, was measured(the pressure fluctuating purge). The measurement results during the conventional flowing purge and during the pressure fluctuating purge are shown in FIG. 2.

Figure 3:
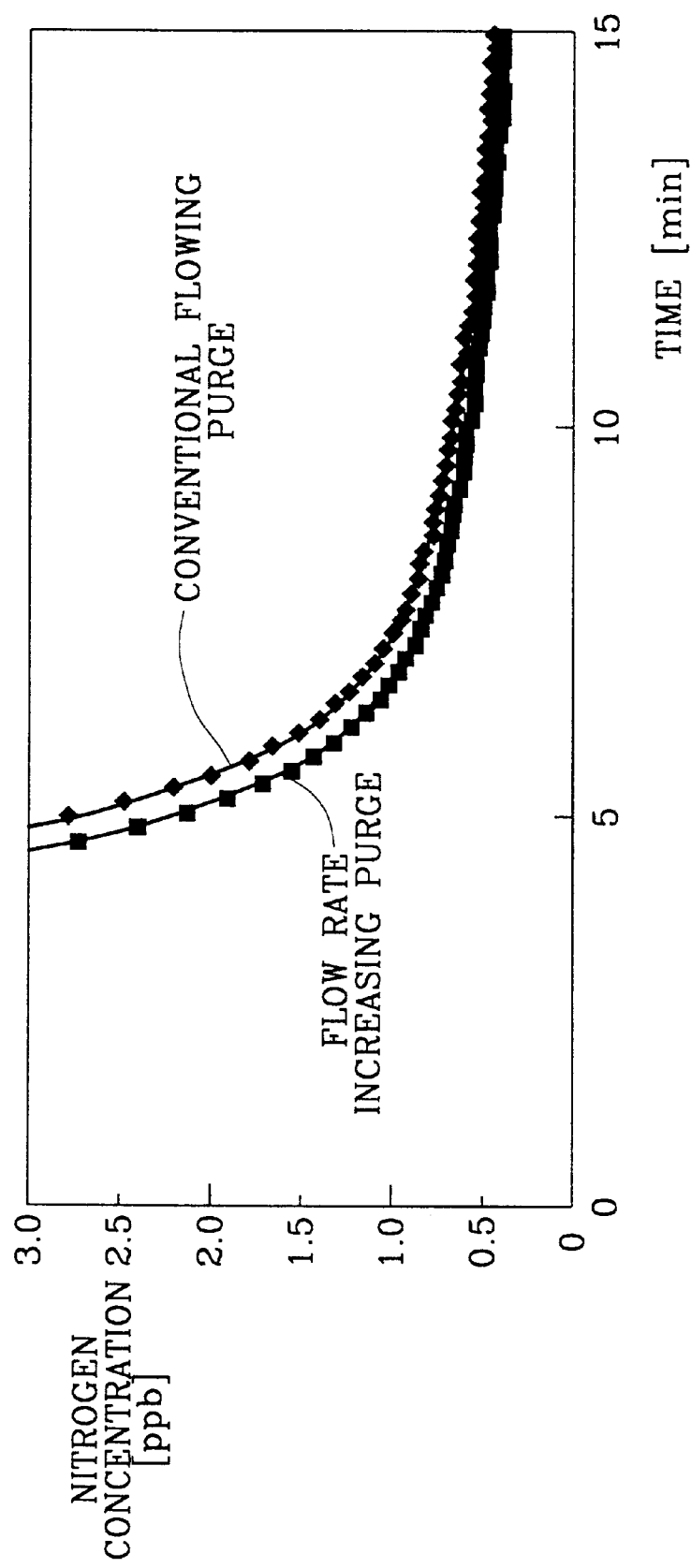
FIG. 3 is a graph showing a concentration change of nitrogen for a conventional flowing purge and a flow rate increasing purge.

Continuously, the operation for increasing the set value of flow rate to 4 litter/min and 3/5 litter/min was carried out for 4 minutes while maintaining the pressure 0.13 Mpa of the standard setting as indicated. Then, the concentration change of nitrogen, when the supply of hydrogen was continued by restoring the flow rate to 2 littler/min and 1/5 litter/min, was measured(the flow rate increasing purge). The measurement results during the flow rate increasing purge and during the above conventional flowing purge as shown in FIG. 3.

Figure 4:
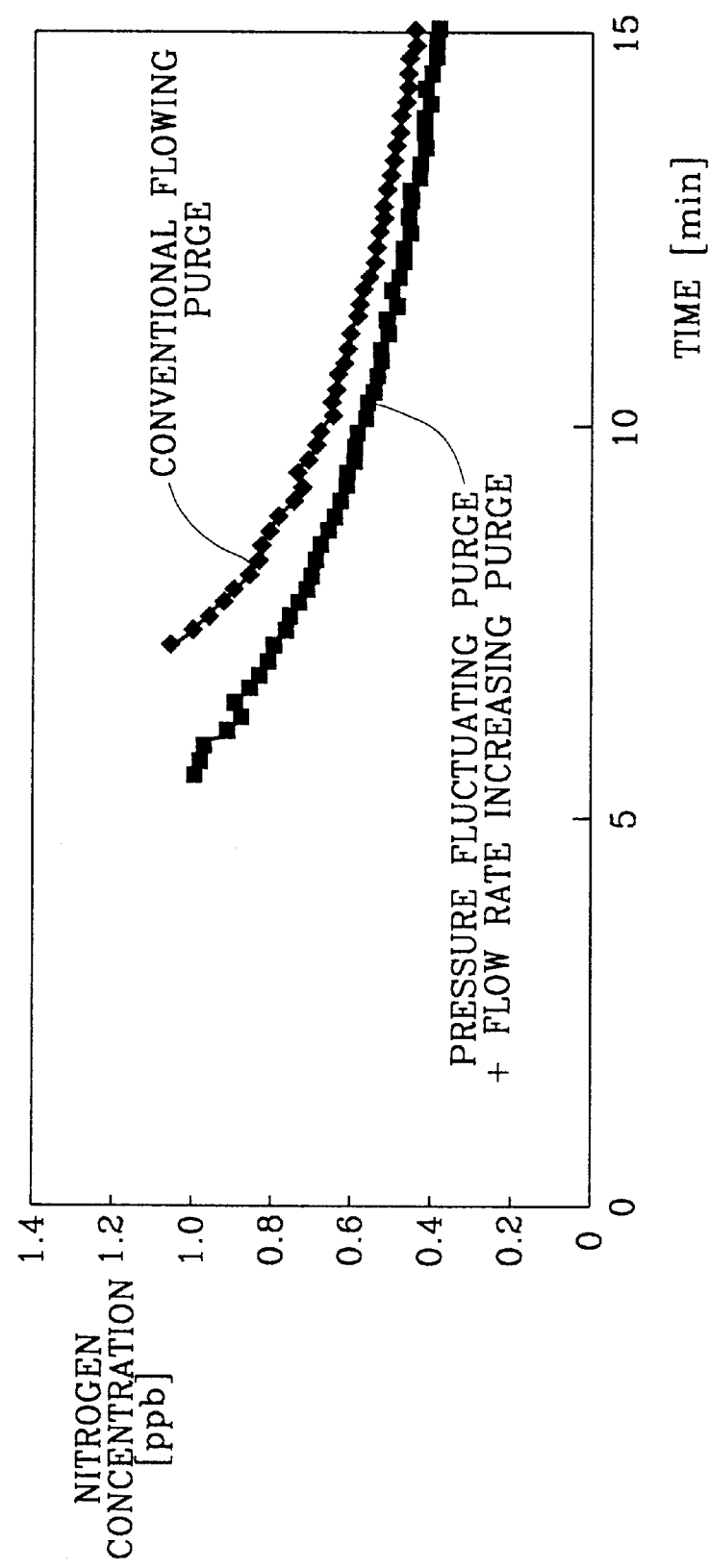
FIG. 4 is a graph showing a concentration change of nitrogen for a conventional flowing purge and a pressure fluctuating purge+a flow rate increasing purge.

Furthermore, after the operation for fluctuating the pressure in the gas system between 0.1 MPa(for 5 seconds) and 0.3 MPa(for 3 seconds) was carried out for 1 minute, the operation for increasing the set value of flow rate to 4 litter/min and 3.5 litter/min was carried out for 3 minutes. Then, the concentration change of nitrogen, when the supply of hydrogen was continued by restoring the flow rate to 2 littler/min and 1.5 litter/min, was measured (the pressure fluctuating purge+the flow rate increasing purge). The measurement results during the above pressure fluctuating purge+the flow rate increasing purge and the measurement result during the above conventional flowing purge are shown in FIG. 4. Moreover, the measurement result after the nitrogen concentration reached 1 ppb, is shown in FIG. 4.

In the respective measurement results, the time until nitrogen concentration reached 1 ppb was 440 seconds for the conventional flowing purge, 400 seconds for the pressure fluctuating purge, 410 seconds for the flow increasing purge, and 330 seconds for the pressure fluctuating purge+the flow rate increasing purge. Furthermore, as shown in FIG. 4, it was understood that the purge performance(the gas substitution performance) was excellent in the region below 1 ppb(sub-ppb level).

As described above, according to the present invention, it is possible to carry out the gas substitution in the gas system in a short time with a good efficiency and there is no, case where damage occurs to the machinery and parts.

What is claimed is:

1. A gas supplying apparatus for switching and supplying plural kinds of gas, the apparatus comprising:

a switching valve for switching the plural kind of gases supplied from gas sources to supply a gas;

a supplying passage for connecting the switching valve with machinery to supply the gas supplied from the switching valve to the machinery;

a gas exhaust passage connected to the gas supplying passage;

a back pressure regulator provided in the gas supplying passage or the gas exhaust passage;

a flow rate regulator provided in the gas supplying passage or the gas exhaust passage; and automatic sequencing means for operating the back pressure regulator and the flow rate regulator with a predetermined sequence.

2. A gas supplying apparatus for switching and supplying plural kinds of gas, the apparatus comprising:

a switching valve for switching the plural kind of gases supplied from gas sources to supply a gas;

a gas supplying passage for connecting the switching valve with machinery to supply the gas supplied from the switching valve to the machinery;

a gas exhaust passage connected to the gas supplying passage;

flow rate regulators provided in the gas supplying passage and the gas exhaust passage;

a back pressure regulator provided in the gas supplying passage; and automatic sequencing means for operating the back pressure regulator and the flow rate regulator with a predetermined sequence.

3. A gas substitution method for substituting a gas after switching into a gas supplying passage by switching a kind of gases to be supplied, the method comprising the steps of:

carrying out an operation for fluctuating a pressure in the gas supplying passage within a range of pressure limitation of component parts thereof until a concentration of a gas before switching remaining in the gas supplying passage becomes ppb level while the gas after switching is made to flow in the gas supplying passage;

setting the pressure to a predetermined pressure; and carrying out an operation for increasing a flow rate of the gas after switching in the gas supplying passage under a flow rate limitation of the component parts thereof until the concentration of the gas before switching remaining in the gas supplying passage becomes sub-ppb level.

4. The gas substitution method according to claim 3, further comprising the steps of:

providing a gas exhaust passage connected to the gas supplying passage;

providing a back pressure regulator in the gas supplying passage or the gas exhaust passage; and providing a flow rate regulator in the gas supplying passage or the gas exhaust passage connected to the gas supplying passage;

wherein the operation for fluctuating the pressure in the gas supplying passage is carried out by the back pressure regulator; and the operation for increasing the flow rate of a gas is carried out by the flow rate regulator.

5. The gas substitution method according to claim 3, further comprising the steps of:

providing a gas exhaust passage connected to the gas supplying passage;

providing flow rate regulators in the gas supplying passage and the gas exhaust passage;

providing a back pressure regulator in the gas supplying passage;

wherein the operation for fluctuating the pressure in the gas supplying passage is carried out by the back pressure regulator; and the operation for increasing the flow rate of a gas is carried out by the flow rate regulator.

* * * * *